(12) United States Patent
Liao

(10) Patent No.: US 6,304,476 B1
(45) Date of Patent: Oct. 16, 2001

(54) VOLTAGE TRANSFORMER HAVING A WIRE-WINDING MECHANISM

(76) Inventor: Sheng-Hsin Liao, No. 10, Alley 38, Lane 229, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/696,035

(22) Filed: Oct. 26, 2000

(51) Int. Cl.[7] ........................................ H02M 1/00
(52) U.S. Cl. ................................................ 363/146
(58) Field of Search ...................... 363/144, 146; 191/12 R, 12.2 R, 12.4

(56) References Cited

U.S. PATENT DOCUMENTS

| | | | |
|---|---|---|---|
| 4,559,575 | * 12/1985 | Noto et al. | 360/133 |
| 6,176,358 | * 1/2001 | Hsin | 191/12.2 R |
| 6,199,674 | * 3/2001 | Liao | 191/12.4 |

* cited by examiner

Primary Examiner—Matthew Nguyen
(74) Attorney, Agent, or Firm—Rosenberg, Klein & Lee

(57) ABSTRACT

The present invention relates to a voltage transformer having a wire-winding mechanism and, more particularly, to a voltage transformer having a power wire capable of automatically winding so that the power wire can be positioned therein. The present invention is characterized in that a wire-winding mechanism is installed in the voltage transformer. The wire-winding mechanism comprises a box body, a winding disk, and a scroll spring. The box body is installed in the housing and has a wire tank formed therein. The winding disk is pivotally installed in the wire tank. The power wire is wound around the winding disk. One end of the power wire can protrude out of the box body. The scroll spring is installed in the box body and joins the winding disk. The length of the power wire can be adjusted according to necessity so that entanglement of wire due to a too-long length of external wire or inconvenience of use due to a too-short length of external wire will not arise.

13 Claims, 8 Drawing Sheets

VOLTAGE TRANSFORMER HAVING A WIRE-WINDING MECHANISM

FIELD OF THE INVENTION

The present invention relates to a voltage transformer having a wire-winding mechanism and, more particularly, to a voltage transformer having a power wire capable of automatically winding, whose length can be adjusted according to necessity so that entanglement of wire due to a too-long length of external wire or inconvenience of use due to a too-short length of external wire will not arise.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external communication wire or inconvenience of use due to a too-short length of external communication wire, several kinds of wire-winding boxes applicable to various kinds of communications apparatuses have been proposed. Most of the wire-winding boxes comprise basically a box body, a housing, a communication wire, two winding disks, and two scroll springs. Thereby, the plug of the communication wire can be plugged on sockets of communications apparatuses to accomplish communications of information.

A communication wire may show a tight state due to the resiliency of the scroll spring when it is pulled out from a conventional wire-winding box so that a proper length of the communication wire cannot be kept outside, resulting in much trouble in use for the user.

It is inevitable to use voltage transformers such as voltage-transforming ectifiers, switching transformers, and car chargers in present communications apparatuses. However, prior art wire-winding boxes are not suitable to voltage transformers. Moreover, for the power wire of a voltage transformer to be practical in use, it must have a certain length. But if it is too long or too short, entanglement of wire or inconvenience of use may arise.

The present invention aims to resolve the above problems.

SUMMARY OF THE INVENTION

The primary object of the present invention is to provide a voltage transformer having a wire-winding mechanism, whereby a long length of the power wire can be wound and received therein using the wire-winding mechanism. The power wire can be pulled out directly from the voltage transformer. A certain restoring tensile force can be kept due to the action of the scroll spring on the power wire so that the power wire can be wound back into the voltage transformer successfully. Thereby, wire entanglement due to a too-long length of external wire or inconvenience of use due to a too-short length of external wire will not arise.

To achieve the above object, the present invention provides a voltage transformer having a wire-winding mechanism, which comprises a housing, a voltage-transforming circuit unit, and a wire-winding mechanism. The voltage-transforming circuit unit is installed in the housing and is connected to a power wire. The wire-winding mechanism comprises a box body, a winding disk, and a scroll spring. The box body is installed in the housing and has a wire tank formed therein. The winding disk is pivotally installed in the wire tank. The power wire is wound around the winding disk. One end of the power wire can protrude out of the box body. The scroll spring is installed in the box body and is connected to the winding disk. A voltage transformer having a wire-winding mechanism is thus formed.

The various objects and advantages of the present invention will be more readily understood from the following detailed description when read in conjunction with the appended drawings, in which:

DETAILED DESCRIPTION OF THE PREFERRED EMBODIMENTS

Figure 1:
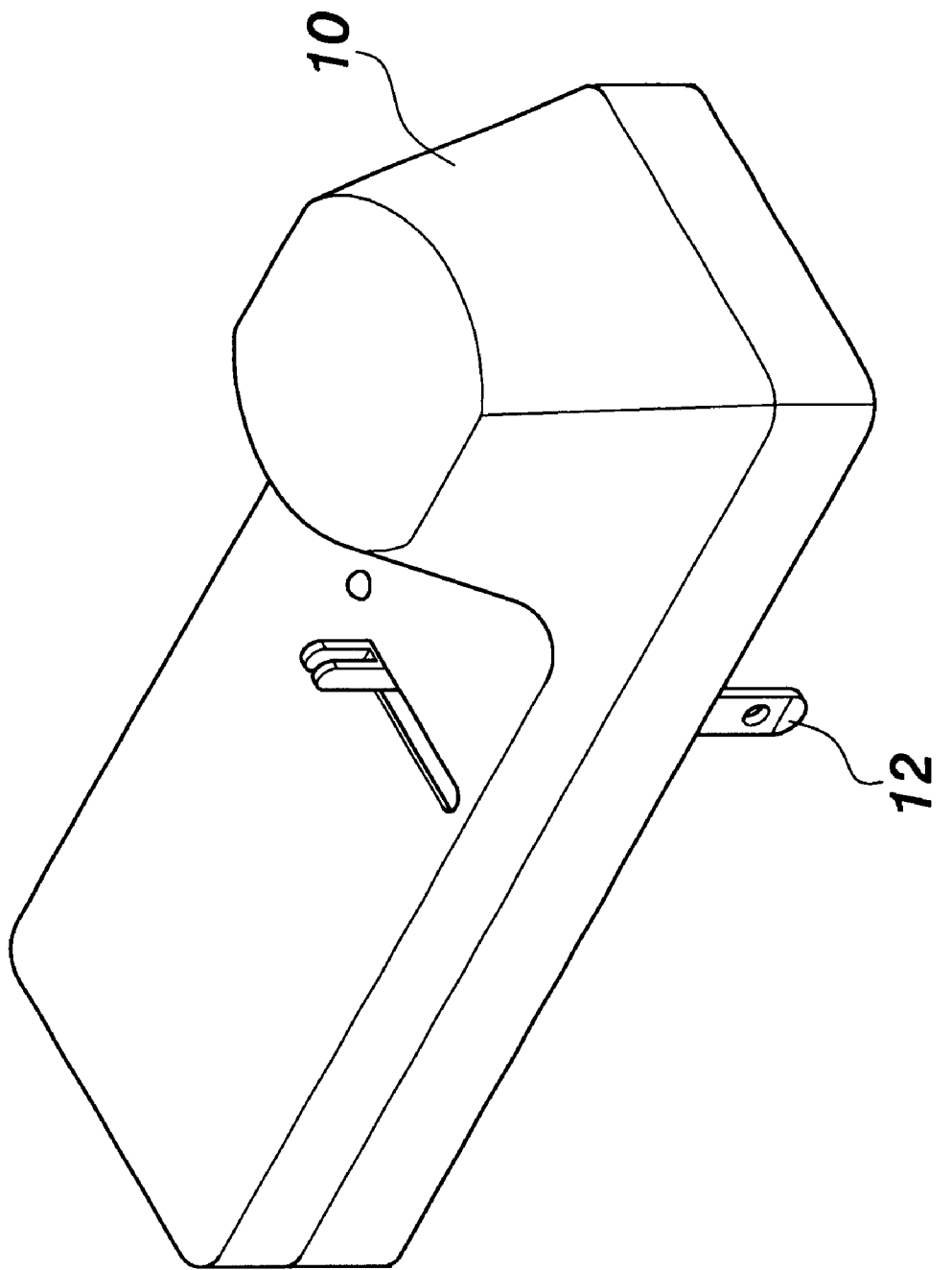
FIG. 1 is a perspective view according to a first embodiment of the present invention.
Figure 2:
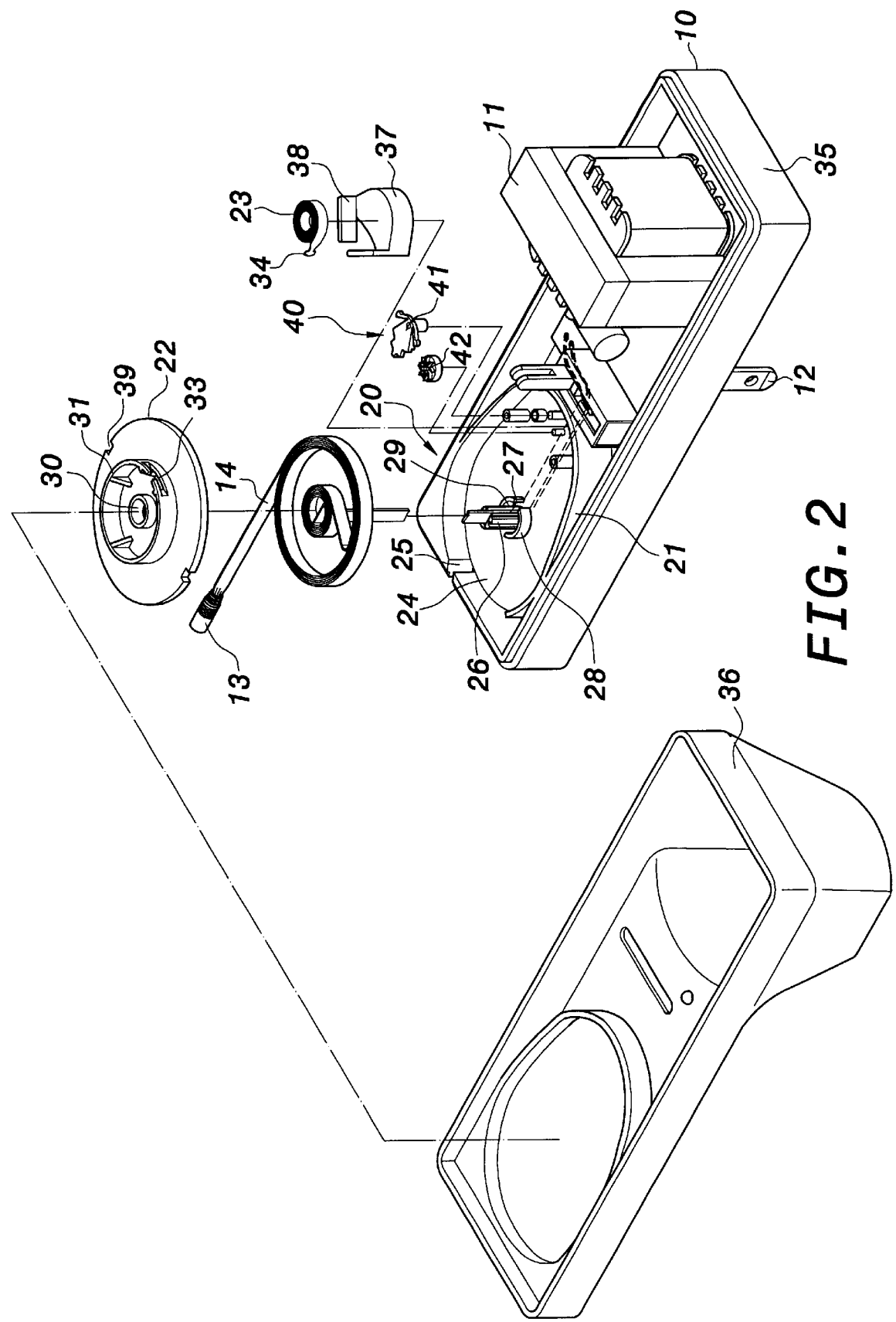
FIG. 2 is an exploded perspective view according to the first embodiment of the present invention.
Figure 3:
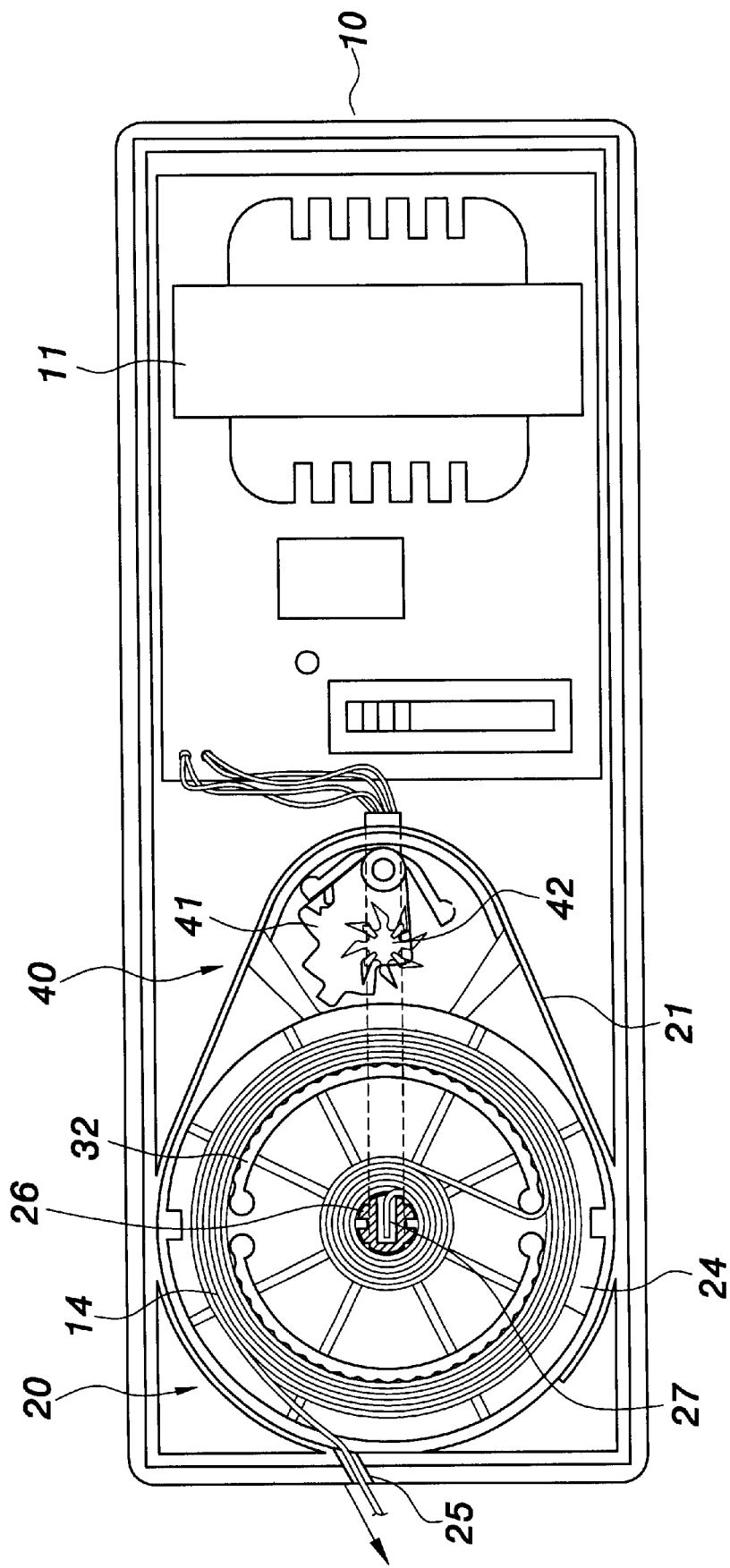
FIG. 3 is a plan view of the internal structure according to the first embodiment of the present invention.

FIGS. 1 to 3 show a voltage transformer having a wire-winding mechanism according to a preferred embodiment of the present invention. The voltage transformer in this embodiment is a voltage-transforming rectifier. The voltage transformer comprises a housing 10. A voltage-transforming circuit unit 11 is installed in the housing 10. The input terminal of the voltage-transforming circuit unit 11 is connected to an input plug 12, and the output terminal thereof is connected to a power wire 14. The other end of the power wire 14 is connected to an output plug 13. The input plug 12 can be plugged into a 110V AC socket. Through the action of the voltage-transforming circuit unit 11, a DC voltage is transferred via the power wire 14 to the output plug 13, which can then be plugged into electric apparatuses to provide required electricity. Because the structure of the above voltage transformer is the same as the prior art structure, it will not be further described.

Figure 4:
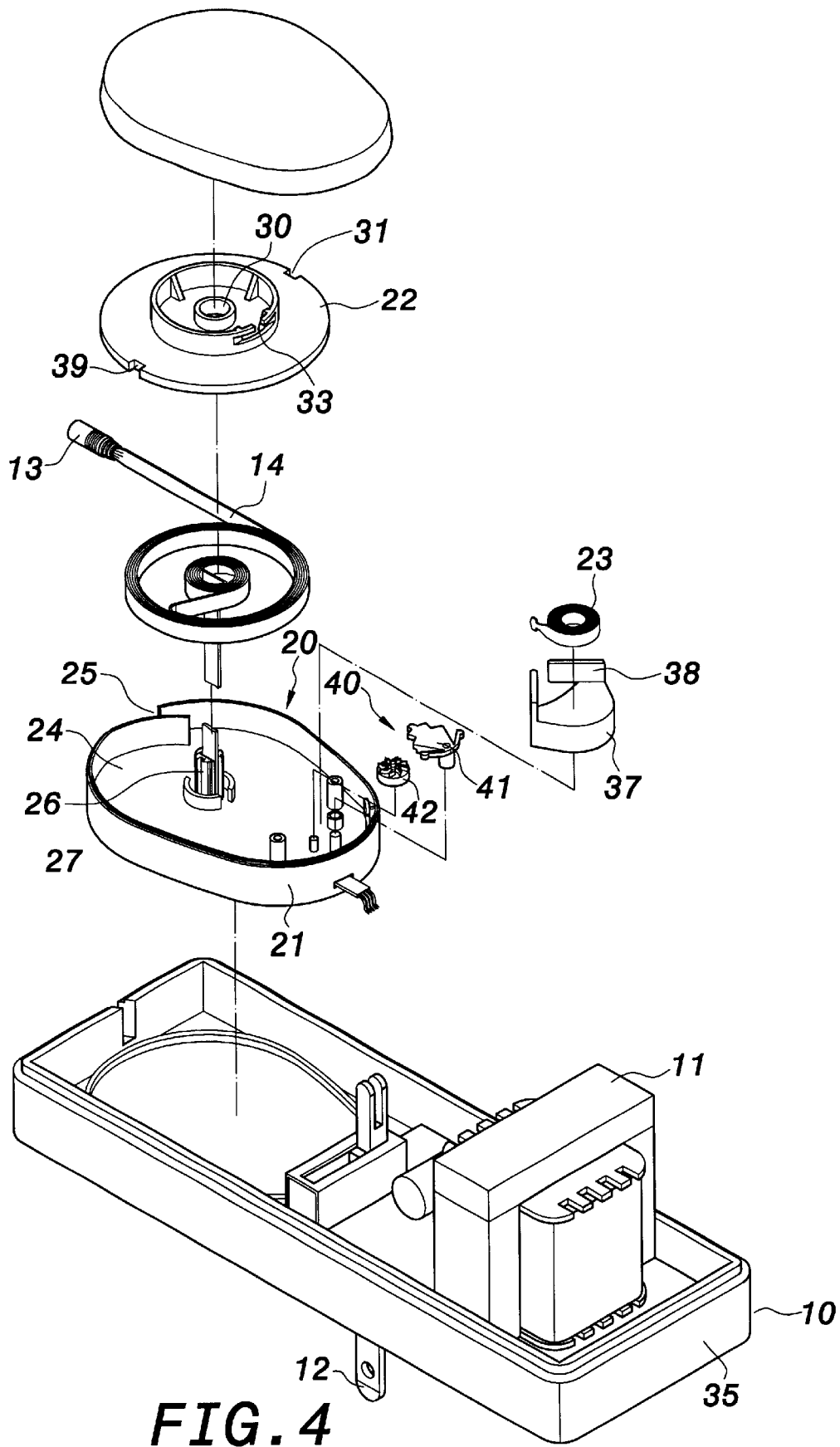
FIG. 4 is an exploded perspective view according to a second embodiment of the present invention.
Figure 8:
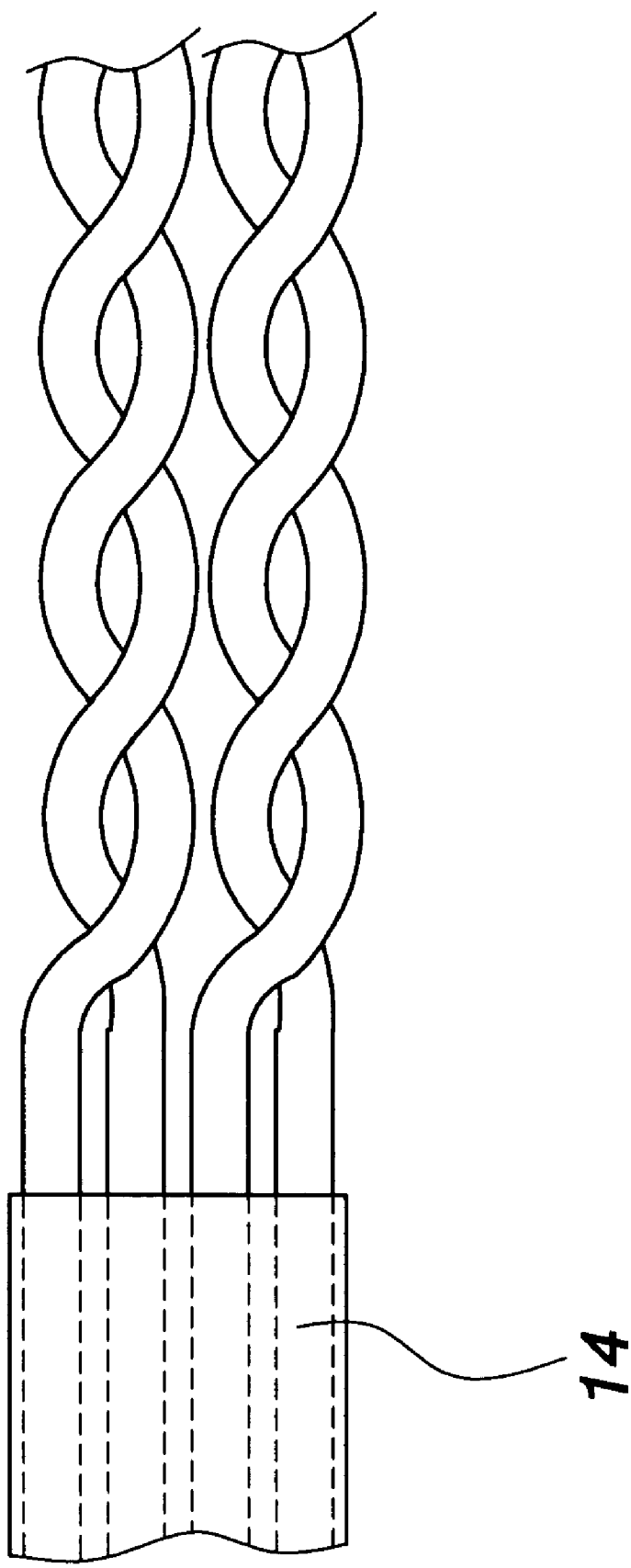
FIG. 8 is a plan view of one end of a power wire of the present invention.

In the present invention, a wire-winding mechanism 20 is installed in the housing 10. The wire-winding mechanism 20 is situated between the output terminal of the voltage-transforming circuit unit 11 and the output plug 13. The wire-winding mechanism 20 comprises a box body 21, a winding disk 22, and a scroll spring 23. The box body 21 can be integrally formed in the housing 10, or can be a separate unit to be assembled in the housing 10, as shown in FIG. 4. A concave wire tank 24 is formed in the box body 21. The power wire 14 is designed to be a flat wire and properly wound to be matched in the wire tank 24 of the box body 21. A wire hole 25 letting one end of the power wire 14 protrude out is formed at a predetermined place on the side of the wire tank 24. A projective shaft 26 is installed at the center of the inner side surface of the wire tank 24. A through groove 27 is axially formed on the projective shaft 26. The through groove 27 extends to the bottom of the wire tank 24 and penetrates to one side adjacent to the voltage-transforming circuit unit 11. At least a positioning element 28 is installed on the inner side surface of the wire tank 24 (two positioning elements 28 are installed in this embodiment). The positioning element 28 is an arc plate surrounding the projective shaft 26 at a predetermined distance so that a positioning groove 29 is formed between the positioning element 28 and the projective shaft 26. One end of the power wire 14 penetrates the through groove 27 on the projective shaft 26 in the wire tank 24. As shown in FIG. 8, two power wires 14 can be combined together and connected to the voltage-transforming circuit unit 11 and the input plug 12. After the power wire 14 penetrates the through groove 27, it can penetrate the positioning groove 29 so as to be gripped and positioned through the positioning groove 29.

The winding disk 22 is a circular disk with a central axle hole 30 formed thereon. A spring-fixing post 31 and a winding ring 32 are installed on two surfaces of the winding disk 22, respectively. The spring-fixing post 31 and the winding ring 32 are concentrically installed to surround the central axle hole 30. A fastening hole 33 is formed on the spring-fixing post 31. The winding disk 22 is received in the wire tank 24 of the box body 21 and is pivotally installed on the projective shaft 26 via the axle hole 30 so that it can rotate in the wire tank 24. The power wire 14 is wound around the projective shaft 26 and outside the winding ring 32 of the winding disk 22. The other end of the power wire 14 protrudes out from the wire hole 25 of the box body 21 so as to be connected to the output plug 13.

The scroll spring 23 is properly positioned in the wire tank 24 of the box body 21. A fastening end 34 of the scroll spring 23 is fastened in the fastening hole 33 of the winding disk 22 so that the scroll spring 23 and the winding disk 22 can be joined. When the winding disk 22 turns, the scroll spring 23 can store energy. The housing 10 comprises a first housing 35 and a second housing 36, which can be assembled together by fastening, screwing, or gluing. Thereby, the wire tank 24 can be closed, and the power wire 14, the winding disk 22, and the scroll spring 23 assembled in the box body 21 can be properly positioned.

In practical use, a long length of the power wire 14 can be wound and received through the wire-winding mechanism 20. The power wire 14 can be pulled out directly from the wire-winding mechanism 20. A certain restoring tensile force can be kept due to the action of the scroll spring 23 on the power wire 14 so that the power wire 14 can be wound back into the voltage transformer successfully. Thereby, entanglement of wire due to a too-long length of external wire or inconvenience of use due to a too-short length of external wire will not arise.

Moreover, a bearing seat 37 can be installed in the wire tank 24 of the box body 21. Two retaining plates 38 extends from two sides of the bearing seat 37 so that the scroll spring 23 can be placed between the retaining plates 38 and the wall of the housing 10. Furthermore, a plurality of fastening grooves 39 are formed on the edge of the winding disk 22 and a reciprocating control device 40 is installed adjacent to the winding disk 22 so that the user will not be disturbed due to the tensile force when he pulls out the power wire 14. The reciprocating control device 40 comprises a swing plate 41 capable of swinging freely and a rag wheel 42 capable of rotating freely. Through the interactive functionality of the swing plate 41, the rag wheel 42, and the fastening groove 39 of the winding disk 22, the power wire 14 can be fixed or received by winding through reciprocating actions of pull and release.

Figure 5:
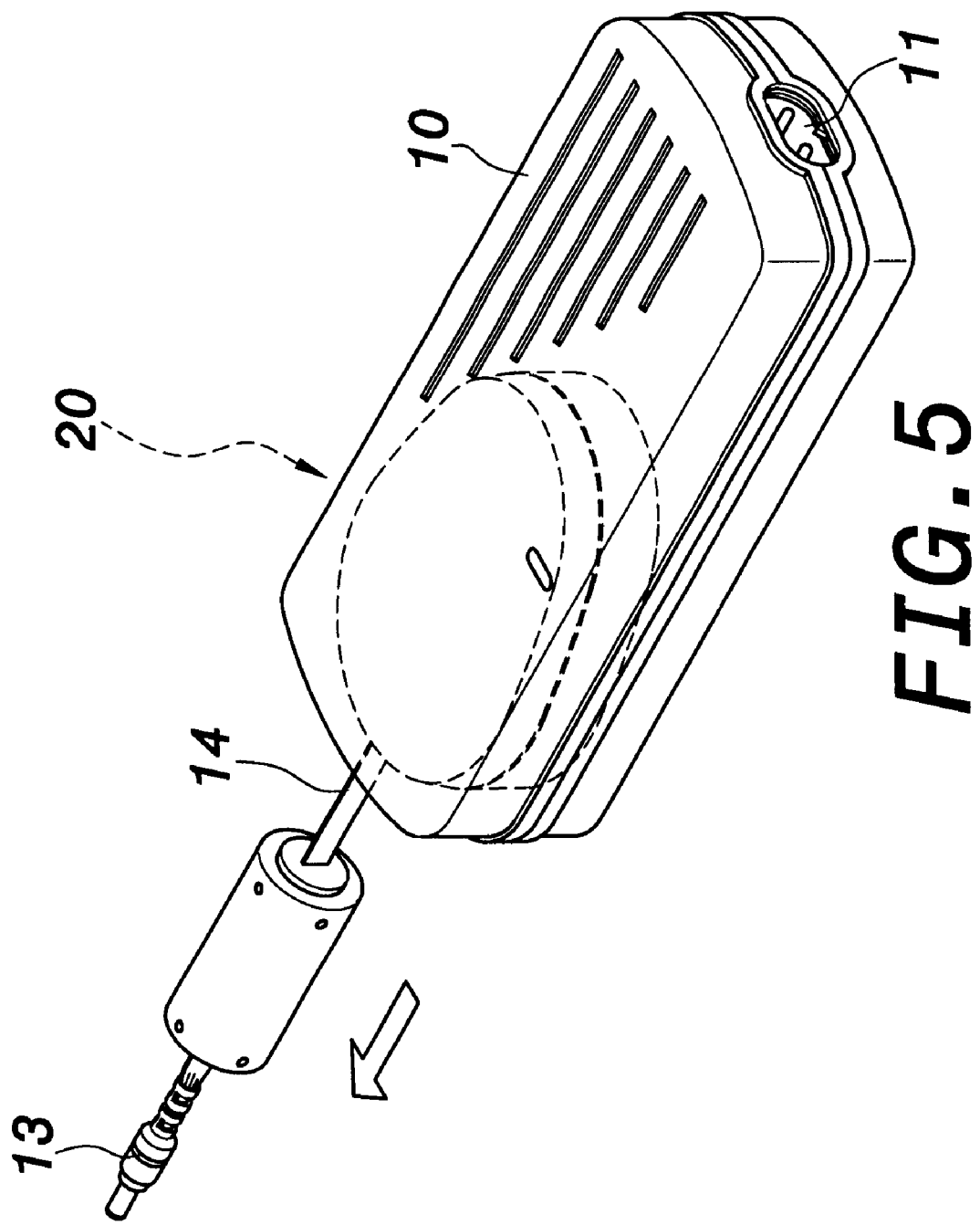
FIG. 5 is a perspective view according to a third embodiment of the present invention.
Figure 6:
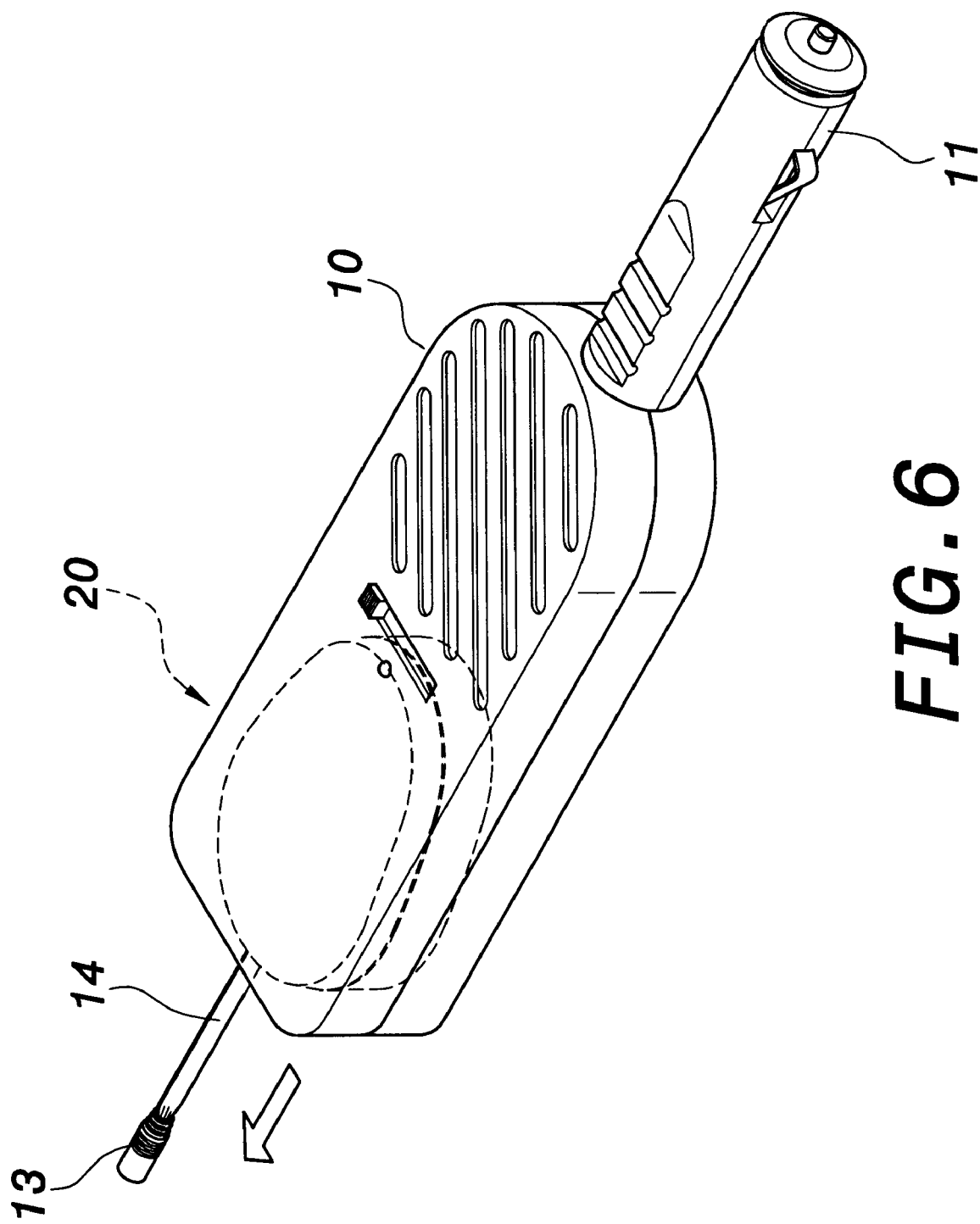
FIG. 6 is a perspective view according to a fourth embodiment of the present invention.
Figure 7:
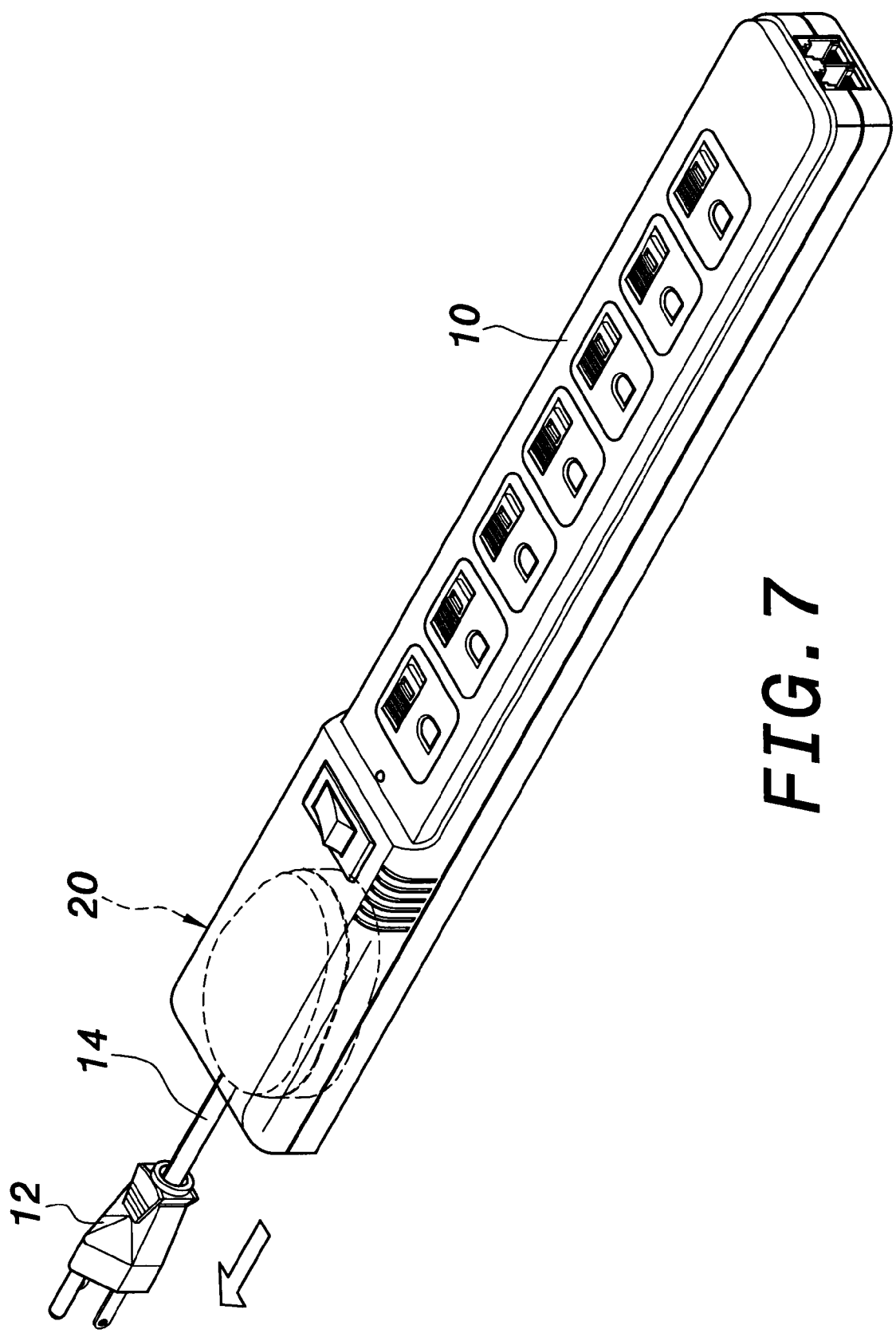
FIG. 7 is a perspective view according to a fifth embodiment of the present invention.

Additionally, as shown in FIGS. 5 to 7, the voltage transformer of the present invention can be replaced with a switching transformer, a car charger, or an extension cord. Moreover, the wire-winding mechanism 20 can be installed between the input terminal of the voltage-transforming circuit unit 11 and the input plug 12.

To sum up, the present invention provides a voltage transformer having a wire-winding mechanism, which can adjust the wire length according to necessity so that entanglement of wire due to a too-long length of external wire or inconvenience of use due to a too-short length of external wire will not arise.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A voltage transformer having a wire-winding mechanism, comprising:
   a housing;
   a voltage-transforming circuit unit installed in said housing and connected to a power wire, and
   a wire-winding mechanism comprising a box body, a winding disk, and a scroll spring; said box body being installed in said housing and having a wire tank therein; said winding disk being pivotally installed in said wire tank, a power wire being wound around said winding disk, one end of said power wire protruding out from said box body; said scroll spring being installed in said box body and joining said winding disk.

2. The voltage transformer having a wire-winding mechanism as claimed in claim 1, wherein the input terminal of said voltage-transforming circuit unit is connected to an input plug.

3. The voltage transformer having a wire-winding mechanism as claimed in claim 1, wherein one end of said power wire is connected to an output plug.

4. The voltage transformer having a wire-winding mechanism as claimed in claim 1, wherein said power wire is a flat wire.

5. The voltage transformer having a wire-winding mechanism as claimed in claim 1, wherein said box body is integrally formed in said housing.

6. The voltage transformer having a wire-winding mechanism as claimed in claim 1, wherein said box body is a separate unit to be assembled in said housing.

7. The voltage transformer having a wire-winding mechanism as claimed in claim 1, wherein a wire hole letting one end of said power wire protrude out is formed at a predetermined place on the side of said wire tank.

8. The voltage transformer having a wire-winding mechanism as claimed in claim 1, wherein a projective shaft is installed on the inner side surface of said wire tank, a through groove axially formed on said projective shaft extends to the bottom of said wire tank and penetrates to one side adjacent to said voltage-transforming circuit unit, and one end of said power wire penetrates said through groove on said projective shaft to be connected to said voltage-transforming circuit unit.

9. The voltage transformer having a wire-winding mechanism as claimed in claim 1, wherein said housing comprises a first housing and a second housing.

10. The voltage transformer having a wire-winding mechanism as claimed in claim 1, wherein a bearing seat is installed in said wire tank of said box body, and two retaining plates extends from two sides of said bearing seat so that said scroll spring can be placed between said retaining plates and the wall of said housing.

11. The voltage transformer having a wire-winding mechanism as claimed in claim 1, wherein a plurality of fastening groove are formed on the edge of said winding disk, and a reciprocating control device is installed adjacent to said winding disk, said reciprocating control device comprising a swing plate capable of swinging freely and a rag wheel capable of rotating freely, said swing plate and said rag wheel being matched with said fastening grooves of said winding disk.

12. The voltage transformer having a wire-winding mechanism as claimed in claim 1, wherein a projective shaft is installed on the inner side surface of said wire tank, a winding ring is installed on one surface of said winding disk, and said winding disk has an axle hole, said winding disk being pivotally installed on said projective shaft via said axle hole, said power wire being wound around said projective shaft and outside said winding ring of said winding disk.

13. The voltage transformer having a wire-winding mechanism as claimed in claim 1, wherein a spring-fixing post having a fastening hole thereon is installed on one surface of said winding disk, said scroll spring is positioning in said wire tank of said box body, and a fastening end of said scroll spring is fastened in said fastening hole of said winding disk.

* * * * *